United States Patent

Wheeler et al.

[11] 3,889,402
[45] June 17, 1975

[54] SHRUB BALLER WITH ARTICULATED DIGGER SUPPORT MEMBERS

[76] Inventors: Robert P. Wheeler, Rt. 3, Box 516, Estacada, Oreg.; Jeffrey P. Wheeler, 1200 E. Powell, Gresham, Oreg. 97030; Henry D. Wheeler, 209 Taylor, Apt. 21, Moscow, Idaho 83843

[22] Filed: Sept. 25, 1973

[21] Appl. No.: 400,536

[52] U.S. Cl. .................................. 37/2 R; 37/2 R
[51] Int. Cl. ............................................ A01g 23/04
[58] Field of Search ....................................... 37/2 R

[56] References Cited
UNITED STATES PATENTS

| | | | |
|---|---|---|---|
| 1,597,281 | 8/1926 | Mills | 37/2 R |
| 2,549,476 | 4/1951 | Johnson | 37/2 R |
| 2,964,860 | 12/1960 | Daniels | 37/2 R |
| 2,990,630 | 7/1961 | Crawford | 37/2 R |
| 3,163,944 | 1/1965 | Whitcomb | 37/2 R |
| 3,594,931 | 7/1971 | Yost | 37/2 R |

Primary Examiner—Edgar S. Burr
Assistant Examiner—R. E. Suter
Attorney, Agent, or Firm—Chernoff & Vilhauer

[57] ABSTRACT

A mobile machine for straddling a row of nursery shrubs and extracting selected ones of such shrubs from any desired location in the row without affecting the other plants. The machine comprises a straddle carrier frame mounted atop a pair of hydraulically driven crawler tracks, the frame side members and tracks being spaced transversely such that they may pass on either side of a particular row of shrubs in the area of separation between adjacent rows. The top of the straddle carrier frame is elevated sufficiently to clear the tops of the shrubs. A respective elongate arm extends forwardly along each side of the machine, each arm being pivoted for rotation about a common transverse axis adjacent the rear of the frame. Respective hydraulic cylinders selectively raise or lower the arms in unison about the axis. At the front of each such arm an extension section is pivotally attached for transverse rotation, such extension sections being actuated by respective hydraulic cylinders adapted for selectively rotating the extension sections in unison away from or toward the longitudinal centerline of the machine. At the forward end of each extension section is a half portion of a digging and balling assembly, each such portion including a pivotally depending digging member adapted to be rotated inwardly about a longitudinal axis toward the opposite digging member so as to extract a particular shrub from the ground while simultaneously forming a compacted ball of soil surrounding the root system.

10 Claims, 4 Drawing Figures

SHRUB BALLER WITH ARTICULATED DIGGER SUPPORT MEMBERS

BACKGROUND OF THE INVENTION

This invention relates to improvements in mobile apparatus for digging and balling nursery shrubs and plants. More particularly the apparatus is of the type featuring a straddle carrier frame mounting a unique digging assembly and linkage for supporting such digging assembly.

Machines for excavating trees, shrubs and other nursery plants are old to the art as exemplified by Yost U.S. Pat. No. 3,594,931, Daniels, Jr. U.S. Pat. No. 2,964,860, Goalard U.S. Pat. No. 3,191,982, Juhl U.S. Pat. No. 3,512,276 and Beeson U.S. Pat. No. 3,193,951. One drawback of the various types of prior art equipment however is that they are not sufficiently versatile to move freely among closely spaced nursery shrubs of any appreciable height so as to be able to extract a particular shrub for transplanting, without damaging the other plants. The Yost machine suggests a partial solution to this problem by utilizing a straddle carrier frame carrying a boom mounted digging implement. While a straddle carrier frame is undoubtedly the most mobile configuration for a selective plant extraction machine, the forwardly extending boom and depending digging implement utilized by Yost impedes rather than complements the otherwise natural manueverability of the straddle carrier frame since it is incapable of lifting the digging implement to an elevation sufficient to clear shrubs of the same height cleared by the carrier. Moreover the digging implement's location and structure impedes visibility of the operator with respect to the particular shrub selected.

In addition, although the prior art digging assemblies are all capable of cutting away a segment of earth along with the root systems of the plant, none are capable of simultaneously compacting the segment into a high density ball of earth surrounding the root system. Yet such compaction aids considerably in preserving the root system of the plant until it can be transplanted. Accordingly there is presently a need in the nursery industry for a mobile machine which can be easily and rapidly operated to selectively extract specific plants and shrubs from a nursery without injuring or otherwise affecting the other plants while, simultaneously with such extraction, forming a compacted ball of earth around the root system to better preserve the plant.

SUMMARY OF THE PRESENT INVENTION

The present invention is directed to a machine of the general type described featuring a mobile straddle carrier frame, preferably mounted atop a pair of individually hydraulically driven crawler tracks. The frame side members and tracks are spaced transversely such that they may pass on either side of a row of shrubs or plants without damaging the plants in adjacent rows, and the top of the frame is elevated sufficiently that the interior space defined within the frame substantially clears the tops of the plants. Along each side of the machine a respective hydraulically actuated support member is mounted extending forwardly from the frame. Each support member includes one of a pair of arms adapted to be raised or lowered in unison about a common transverse axis adjacent the rear of the frame. Respective laterally pivoting arm extension sections are attached to the front of each such arm and are hydraulically powered by means of cylinders so that the extension sections can be rotated inwardly or outwardly with respect to the longitudinal centerline of the machine. Pivotally depending from the front of each extension section is one of a pair of opposed complementary digging members, each adapted to be rotated inwardly by a hydraulic cylinder about its respective longitudinal pivot axis toward the opposite digging member and being shaped so as to form an open-topped enclosure when the two members are joined together. Each digging member includes wall means for retaining substantially all of the soil in the rotational path of the member so as to compact the retained soil between the two members. The support members are capable of raising the bottom of the digging members at least to the top of the interior space defined by the straddle carrier frame so that the digging members will not interfere with the free movement of the frame among the nursery shrubs.

The foregoing combination of features enables the machine to straddle a row of nursery shrubs or plants, traveling with its digging assembly elevated so as not to injure any of the shrubs, until it arrives at a position where the digging members can engage the particular plant desired. Thereafter the digging members are positioned on either side of the plant and rotated inwardly to a closed position, thereby extracting the plant from the ground and simultaneously forming a compacted ball of soil around its roots due to the fact that the members excavate and retain a substantial amount of earth from each side of the plant adding to the mass ultimately contained around the root system. During such operation the digging assembly and shrub are within the full view of the operator due to the fact that no structure interferes with his line of vision. For transporting the plant, the support members may be raised until the digging assembly clears the tops of the other shrubs in the row, and the machine may be driven to the end of the row.

Accordingly it is a primary objective of the present invention to provide a unique digging and balling machine having a high degree of mobility for working around closely spaced nursery shrubs of considerable height without injuring or damaging them, so as to enable the selective extraction of specific ones of the plants.

It is a further principal objective of the invention to provide a novel digging and balling assembly which not only extracts the selected plant with its root system intact and with a ball of earth surrounding the root system, but also simultaneously compacts such earth into a ball having considerably greater density than the normal density of the soil from which the plant is extracted.

It is a further objective of the present invention to provide such a machine which is simple in structure and yet provides sufficient strength and power for the digging assembly to effect the desired compaction.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 3:
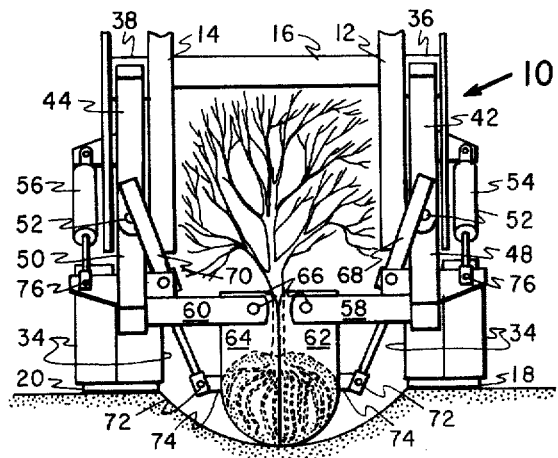
FIG. 3 is a partial front view of the machine showing the relation of the digging assembly and frame to a freshly extracted nursery shrub.

The mobile machine of the present invention, designated generally as 10 in the figures, comprises a straddle carrier frame consisting of two side frame weldments 12 and 14 spaced transversely apart and joined together rigidly at their tops by a series of cross members, one of which is shown as 16 in FIG. 3. Each side frame weldment 12 and 14 is mounted on a respective crawler track 18, 20, each such track being driven by its own individual hydraulic motor 22 through a chain and sprocket assembly 24, 26. Mounted atop the straddle carrier frame is an engine 28 which drives a pair of conventional hydraulic pumps (not shown), one such pump serving to provide pressurized oil to each of the hydraulic drive motors 22 while the other pump supplies pressurized oil to the various hydraulic cylinders which operate the support members and digging apparatus to be described hereafter. A series of manually controlled hydraulic valves 30 serve to regulate the direction and amount of flow of the hydraulic fluid to the respective motors and cylinders, such valves being located within convenient reach of an operator seated in the operator's chair 32 mounted atop the frame. Traveling and steering of the vehicle is regulated by valves 30a and 30b which vary flow to the respective hydraulic motors 22. By moving both levers 30a and 30b simultaneously forward from a center position, hydraulic fluid is directed to the motors causing the tracks to move in a forward direction, while conversely moving the levers backward from the center position reverses the flow path of the fluid through the motors and cause the tracks to move backward. If the levers 30a and 30b are pushed the same distance in a particular direction the respective flows to the motors are equal causing the machine to move in a straight line while, if one lever is pushed further than the other, flow to that motor will be greater and the machine will turn. To achieve an extremely tight turn, one lever may be moved to a forward position while the other lever is moved to a reverse position, thereby causing the tracks to move in opposite directions.

The side frame weldments 12 and 14 respectively are spaced a sufficient transverse distance apart, and the top cross members 16 of the frame are sufficiently elevated, so as to define an interior space within the frame wide and tall enough to permit the frame to straddle a row of typical nursery shrubs or trees as illustrated in FIG. 3 without substantially interfering with the branches or tops of the plants. (An interior space having a width of about 2½ feet or more and a height of about 5 feet or more is considered suitable for most types of nursery plants.) The side frame weldments 12 and 14 must be sufficiently close together however that the tracks 18 and 20 will pass through the areas separating the straddled row of shrubs from the immediately adjacent rows on either side. For example if the transverse row spacing is 3½ feet, the outside track width of the machine should preferably not exceed 5 feet so as to permit the tracks easily to clear the trunks of adjacent shrubs. As will be readily apparent to those skilled in the art, the height and transverse width of the straddle carrier frame may be variable depending upon the row spacing utilized in a particular nursery and the height and breadth of the shrubs involved. To further insure the safety of the shrubs as the machine travels about the nursery, shrouds 34 enveloping both the inner and outer sides of each track 18, 20 are provided so as to eliminate the possibility of low lying branches catching in the tracks or being run over.

Mounted on either side of the frame at the rear of the machine 10 are a pair of clevis-type brackets 36 and 38 respectively, having pins 40 inserted therethrough on a common transverse axis. Pivotally mounted to the pins 40 and extending forwardly therefrom are a pair of support members designated generally as 41 and 43, comprising arms 42 and 44 and arm extension sections 48 and 50 respectively. A pair of double acting hydraulic cylinders 46 (only one of which is shown) interconnect the respective arms 42, 44 with the side frame weldments 12 and 14 and serve to selectively raise or lower the arms in unison in the general manner depicted in FIG. 1.

Figure 2:
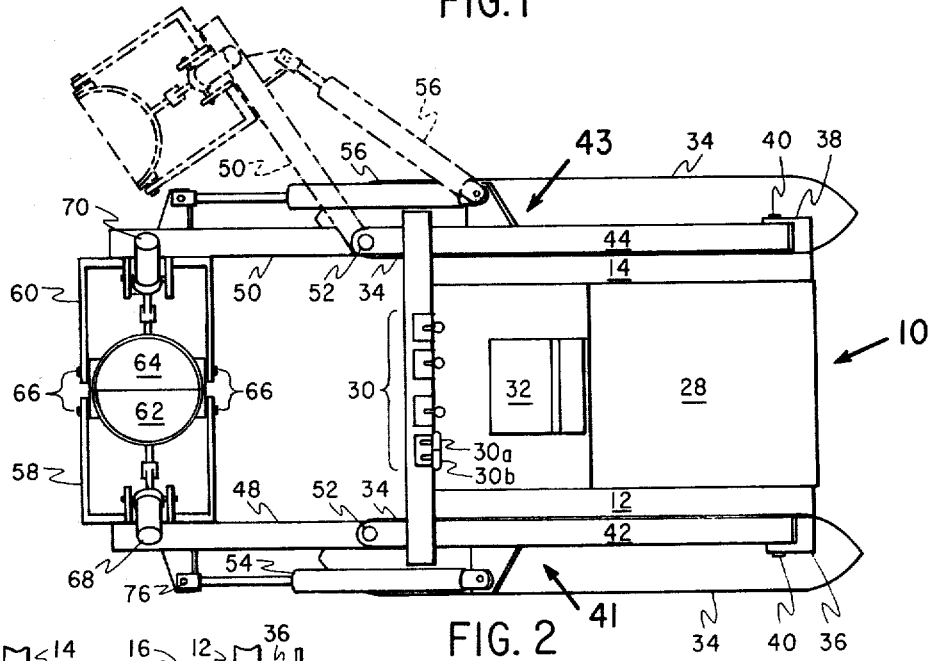
FIG. 2 is a top view of the machine showing the articulating arm extension sections in their closed positions, one of such sections also being shown in its open position.

At the front of each arm 42, 44, respective arm extension sections 48 and 50 are pivotally attached by means of pins 52 for transverse movement inward or outward with respect to the longitudinal centerline of the machine 10, as illustrated in FIG. 2 with respect to extension section 50. A pair of double acting hydraulic cylinders 54 and 56 interact between the arms 42, 44 and their respective extension sections 48, 50 to pivot the extension sections in unison between their open and closed positions. A pair of opposed clevis members 58, 60 are rigidly attached to the respective extension sections, protruding inwardly at right angles therefrom. Pivotally mounted by means of pins 66 within each such clevis member 58, 60 is a respective depending digging member 62 and 64. The digging members are selectively pivoted in unison either inwardly or outwardly with respect to one another about their respective pivot axes by means of a pair of double acting cylinders 68 and 70 which are pivotally mounted inside the respective clevis members.

It will be understood that each of the three respective pairs of hydraulic cylinders just discussed, i.e., cylinders 46, cylinders 54 and 56 and cylinders 68 and 70, is actuated in unison by a respective one of the control values 30 causing a selected pair either to retract or extend. The simultaneous movement of the cylinders of each pair is preferably achieved by the use of flow dividers which equalize flow of hydraulic oil between the cylinders.

Figure 1:
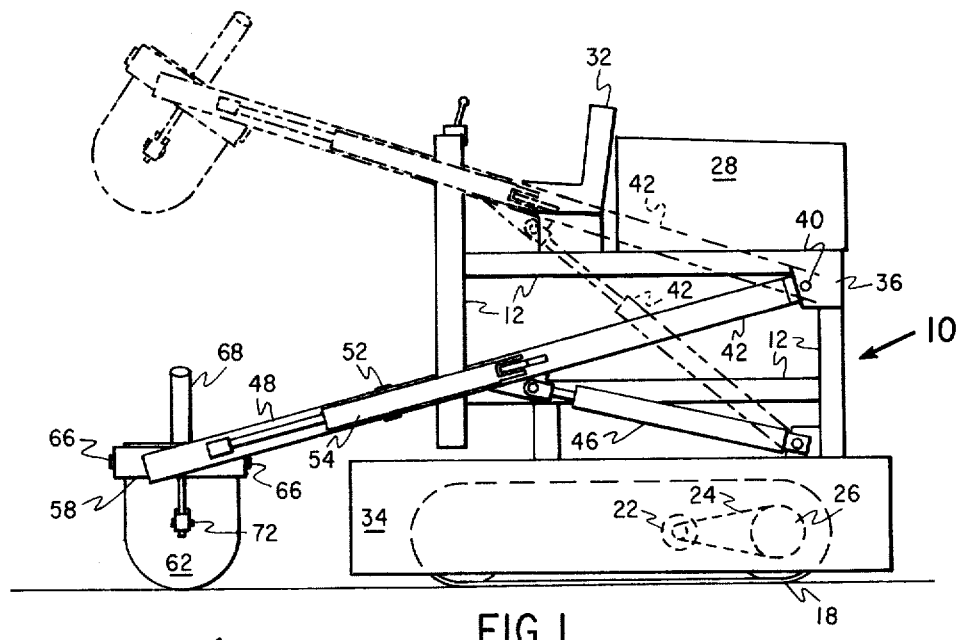
FIG. 1 is a side elevation view of an illustrative embodiment of the mobile digging and balling machine, showing the digging assembly and its support members in raised and lowered positions respectively.

In operation, the machine 10 may be driven along a row of shrubs straddling the plants in the row with its digging assembly elevated as shown in phantom in FIG. 1 so as not to strike or interfere with any of the plants. The support members 41, 43 are capable of lifting the bottom of the digging assembly at least as high as the top of the interior space defined within the straddle carrier frame, so as not to limit the height of the plants which can otherwise be straddled by the frame. When the machine reaches a position where its digging members 62, 64 can be positioned on either side of a particular shrub to be extracted, the arm extension sections 48, 50 are rotated outwardly by the retraction of cylinders 54, 56 and the arms 42, 44 are lowered by retraction of cylinders 46 until the bucket-halves 62, 64 engage the ground on either side of the shrub. If the digging members are not already in their open positions cylinders 68 and 70 are retracted to open them. Thereafter cylinders 54 and 56 are extended to swing the open digging members into close proximity with one another on either side of the shrub, and cylinders 46 are further retracted to maximize the weight on the digging members. Cylinders 68 and 70 are then extended rotating the digging members downwardly into the ground toward one another, cutting a path through the earth to either side of the plant until they come together forming an enclosure as depicted in FIG. 3 encompassing the root system of the shrub. It is significant to note that, during the inward rotation of the digging members, their high surrounding bucket-shaped walls cause substantially all of the earth in their path to be excavated from either side of the shrub and retained within the members so that ultimately the earth is compacted about the plant's root system as the members come together. This is in contradistinction to all of the prior art digging assemblies which utilize merely a cutting motion to extract the tree without simultaneously retaining the earth in an enclosure and increasing its density by means of a compressive motion. The compacted ball of earth obtainable by means of applicant's invention helps substantially to maintain the integrity of the tree's root system and maintain its life in the period between its extraction and its transplanting. In the preferred embodiment, the digging members are shaped so as to form an open-topped enclosure having a generally hemispherical bottom when joined together, as this produces the best and most efficient ball configuration.

When the shrub has been extracted in the foregoing manner, cylinders 46 are extended to raise the closed digging assembly and shrub to the elevated position shown in phantom in FIG. 1. This permits the machine 10 to travel to the end of the row of shrubs without striking or otherwise injuring the remaining shrubs. Thereafter the assembly may be lowered to the ground and opened, permitting the removal of the plant whose balled and compacted root system may then be wrapped for delivery to a transplanting location.

Figure 4:
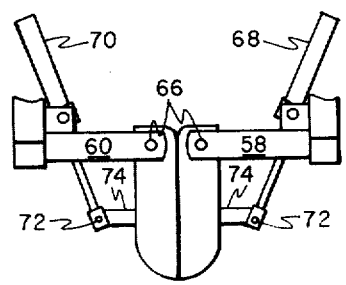
FIG. 4 is a front view of the digging assembly illustrated with smaller digging members for use in extracting plants having smaller root systems.

It is contemplated that complementary digging members of different sizes will be provided with the machine 10 so that balls of different diameter can be formed, depending upon the size of the particular type of plant to be extracted. To achieve this purpose the pins 66 about which the digging members 62, 64 rotate, as well as pins 72 which connect the piston rods of the cylinders 68 and 70 with the digging members, are designed to be easily removable, being held in place by cotter pins or snap ring retainers of conventional design (not shown). The distance from the lower cutting edge of the digging members to the pins 66 is the same regardless of the width of the digging members, as are the relative locations of the connections for pins 72, so that the various sized digging members can be interchangeably mounted on the clevis members 58, 60 and can operate in the same manner regardless of the diameter of the ball desired. By way of example, FIG. 4 illustrates a digging assembly adaptable for forming smaller balls than that shown in FIG. 3, mounted on the same clevis members 58, 60. Pins 52 joining the arms 42, 44 with their respective extension sections 48, 50 are similarly removable, as are clevis pins 76 coupling cylinders 54, 56 to the extension sections, so that the extension sections may be easily removed and replaced with other extension sections mounting a different type of working implement if desired.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A mobile machine for digging and balling nursery shrubs comprising:
   a. a mobile straddle carrier frame comprising a pair of transversely spaced vertical side frame members joined at their tops by a horizontal cross member so as to define an interior space within said members extending throughout the length of said frame and being open on both ends and at the bottom;
   b. a pair of transversely spaced support members, each mounted on a respective one of said side frame members on either side of said interior space;
   c. power means mounted on said frame for vertically reciprocating said transversely spaced support members in unison with respect to said frame;
   d. a pair of complementary digging members, each depending from a respective one of said transversely spaced support members; and
   e. second power means mounted on each of said transversely spaced support members for selectively moving said support members toward or away from one another.

2. The machine of claim 1 wherein said straddle carrier frame is mounted on a pair of crawler tracks and wherein shrouds are mounted along both the inside and outside of each said track for substantially covering the sides of said tracks throughout their length.

3. The machine of claim 1 wherein said straddle carrier frame is mounted on a pair of crawler tracks, each said track being driven by an individually controlled reversible hydraulic motor.

4. A mobile machine for digging and balling nursery shrubs comprising:
   a. a mobile frame;
   b. a pair of transversely spaced opposed support members mounted for vertical movement with respect to said frame;
   c. first mechanical power means for selectively raising and lowering said support members with respect to said frame; d. a pair of opposed complementary digging members, each pivotally depending from one of said support members sp as to rotate about a respective pivot axis toward one another, and each including a wall means which is not concentric about said pivot axis for retaining substantially all of the soil in the path of each said digging member as said members rotate toward one another and compacting said retained soil between said digging members;

e. second mechanical power means mounted on each of said transversely spaced support members for moving said support members toward or away from one another; and f. third mechanical power means mounted on each of said support members for selectively rotating the bottom edges of said respective digging members about said respective pivot axes toward one another.

5. The machine of claim 4 further including a second pair of said digging members, said respective pairs being of different sizes, and including connecting means for interchangeably mounting either one of said pairs of digging members operatively on said support members.

6. A mobile machine for digging and balling nursery shrubs comprising:

a. a mobile straddle carrier frame comprising a pair of transversely spaced vertical side frame members joined at their tops by a horizontal cross member so as to define an interior space within said members extending throughout the length of said frame and being open on both ends and at the bottom;

b. a pair of transversely spaced, forwardly extending arms mounted along either side of said frame and pivotally connected thereto for rotation about a common transverse pivot axis;

c. first power means interacting between said frame and said arms for selectively raising or lowering said forwardly extending arms in unison aboaut said pivot axis;

d. a pair of transversely spaced arm extension sections extending forwardly in front of said frame, each pivotally mounted to the forward end of a respective one of said arms so as to rotate transversely inwardly and outwardly with respect to the longitudinal centerline of said machine so as to form, in combination with said arms, a pair of transversely articulated support members extending along either side of said frame;

e. second power means connected to said respective extension sections for selectively pivoting said extension sections inwardly or outwardly; and f. a pair of complementary digging means, each mounted on the forward end of a respective one of said extension sections, for digging into the ground at opposed locations to one another.

7. The machine of claim 6 wherein said digging means comprises respective opposed complementary digging members each forming half of an open-topped enclosure when they are joined together and each depending pivotally from a respective one of said extension sections so as to rotate about respective longitudinal pivot axes, said pivot axes being movable transversely inwardly and outwardly with respect to one another in response to said transverse rotation of said extension sections, and including third power means interacting between said extension sections and said digging members for selectively rotating said digging members toward one another to form said enclosure.

8. The machine of claim 7 wherein said enclosure formed by said digging members has a hemispherically shaped bottom.

9. The machine of claim 6 wherein the length of each of said articulated support members is sufficient when rotated upwardly by said first power means to lift the bottoms of said respective digging means at least as high as the top of said interior space defined by said straddle carrier frame.

10. The machine of claim 6 including removable coupling means for mounting said extension sections to said arms and to said second power means respectively.

* * * * *